(12) United States Patent
Fray et al.

(10) Patent No.: US 8,313,624 B2
(45) Date of Patent: Nov. 20, 2012

(54) ELECTRODE MATERIALS

(75) Inventors: Derek John Fray, Cambridge (GB);
Gregory Russlan Doughty, Sheffield (GB)

(73) Assignee: Green Metals Limited, London (GB)

( * ) Notice: Subject to any disclaimer, the term of this patent is extended or adjusted under 35 U.S.C. 154(b) by 132 days.

(21) Appl. No.: 12/669,446

(22) PCT Filed: Jul. 15, 2008

(86) PCT No.: PCT/GB2008/002411
§ 371 (c)(1),
(2), (4) Date: Aug. 2, 2010

(87) PCT Pub. No.: WO2009/010737
PCT Pub. Date: Jan. 22, 2009

(65) Prior Publication Data
US 2010/0282602 A1    Nov. 11, 2010

(30) Foreign Application Priority Data

Jul. 18, 2007   (GB) .................................. 0714021.3

(51) Int. Cl.
*C25B 11/04* (2006.01)
*C25B 11/06* (2006.01)
*C25B 11/08* (2006.01)
*C25C 3/28* (2006.01)

(52) U.S. Cl. .................. 204/291; 204/292; 204/290.01; 204/290.14; 205/398; 205/401; 205/402

(58) Field of Classification Search .................. 204/291, 204/292, 290.01, 290.14; 205/398, 401, 205/402
See application file for complete search history.

(56) References Cited

U.S. PATENT DOCUMENTS

| | | | | |
|---|---|---|---|---|
| 3,616,446 A | * | 10/1971 | DeWitt | 204/290.1 |
| 3,902,985 A | * | 9/1975 | Raetzsch et al. | 204/268 |
| 4,341,612 A | | 7/1982 | Oda et al. | |
| 4,511,442 A | * | 4/1985 | Pellegri | 205/501 |
| 2004/0237711 A1 | * | 12/2004 | Ono et al. | 75/10.58 |
| 2006/0263614 A1 | * | 11/2006 | Andolfatto et al. | 428/469 |
| 2008/0053838 A1 | * | 3/2008 | Yamaguchi et al. | 205/401 |

* cited by examiner

*Primary Examiner* — Bruce Bell
(74) *Attorney, Agent, or Firm* — Kilpatrick Townsend & Stockton LLP

(57) ABSTRACT

An inert anode material for use in electrolytic processes comprises calcium ruthenate. [Note that the nominal formula for this compound is $CaRuO_3$, although different stoichiometries may apply in practice].

13 Claims, No Drawings

ELECTRODE MATERIALS

This invention relates to new electrode materials and, more particularly but not exclusively, to anode materials for use in electro-chemical metal winning processes.

Electro-chemical metal winning processes are generally conducted in a bath containing a molten electrolyte or melt, the bath also having a cathode and an anode immersed in the electrolyte or melt such that, with an electric potential difference applied between the anode and cathode, metal is reduces at, or in the vicinity of, the cathode and oxidation of the anion occurs at, or in the vicinity of, the anode.

Many electrolytic extraction processes are known or are being newly devised for the recovery of metals from a variety of start materials. Many of these processes require an anode that is inert, and will remain inert as the processes continue, to attack from the different species present in the baths in which the processes are being conducted.

Stable inert anode materials must generally exhibit good electrical conductivity, must not dissolve in the bath or react with substances in the bath, evolved or given off in the bath during operation of the process.

The Hall-Heroult process, for example, for the production of aluminium utilises a bath with a molten fluoride melt and a carbon anode. This anode tends to be consumed in use and problems associated with the formation of dust therefrom are commonly encountered. As a result, there has been a concerted effort over the past seventy years or so to discover an improved anode material that could withstand the melt, fluorine and oxygen.

Oxide materials have been investigated and recent work has suggested that tin oxide might be suitable as an inert anode material. However, there tends to be some contamination of the aluminium with tin as the oxide is gradually consumed during the process.

Cermet materials comprising nickel ferrites and silver and copper have also been investigated for inert anode materials. Another approach has been to use metallic components that form an oxide which very slowly dissolves in the melt. Various problems have been encountered with both these proposals and neither has been used in practice.

Extensive experimental work has shown that some metal alloys, for example Haynes™ nickel-chromium alloys are generally stable in aggressive melts. As soon as an anodic potential is applied in a bath with such anodes, however, the alloy material tend to corrode very quickly and dissolves in the melt.

Titanium silicon carbide has also been investigated. It has been found, however, that, under conditions of an operating bath, calcium titanate forms on the anode. This material is an insulator so that the material can no longer function as an electrode.

One particular electrolytic process for the recovery of titanium and other metals from oxidic start materials incorporating the metal is known as the Cambridge FFC process. This is process is described in Patent Application No WO 99/64638 in the name of Cambridge University Technical services Limited.

In the Cambridge process, the bath comprises a melt of calcium chloride at an operating temperature of the order of 900 degrees C., the metal oxide material forms the cathode and an anode is present. On application of a potential to the cathode, the oxygen in the metal oxide is ionised and dissolves in the melt. Calcium chloride has a significant solubility for oxygen ions which diffuse to the anode where the ions are discharged.

In the development of the FFC process, carbon has commonly been proposed and tested as an anode material. It does, however, tend to react with the oxygen to form a mixture of carbon dioxide and carbon monoxide. In practice, therefore, the anode tends to be consumed as a result of this reaction. In addition, the carbon anode tend to break down mechanically during the reaction and form particles that are distributed throughout the melt, thereby leading to a waste of current through a short circuit and contaminating the product. Impurities in the carbon anode will also tend to contaminate the cathode product.

Furthermore, the carbon dioxide that forms on the anode in the above reaction has a significant solubility in the calcium chloride and the dissolved carbon dioxide can diffuse to the cathode where discharge can occur as follows:

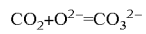

$$CO_2 + O^{2-} = CO_3^{2-}$$

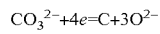

$$CO_3^{2-} + 4e = C + 3O^{2-}$$

The oxygen ions can then diffuse to the anode, form more carbon dioxide, and the whole process is repeated. This can also lead to a decrease in the current efficiency and contamination of the product with carbon.

There is therefore a need for an anode material that can overcome these and similar problems and generally remain inert during electrolytic processes especially processes for the electro-deoxidation of metal oxides.

Anode materials of the invention have been found generally to satisfy this need.

In accordance with the invention, there is provided an inert anode material for use in electrolytic processes which comprises calcium ruthenate. [Note that the nominal formula for this compound is $CaRuO_3$ although different stoichiometries may apply in practice].

Anodes made from the anode materials of the invention, and also electrolytic processes utilising the anode materials of the invention as anodes in electrolytic cells are all included in the scope of this invention.

It has surprisingly been found that calcium ruthenate anode material exhibits, in use in an electrolytic processes, excellent electrical conductivity and resistance to attack in a wide variety of electrolytes/melts.

In investigating the anode material of the invention, it was found that it is particularly suitable for use in the Cambridge FFC process (and related processes) using, as stated above, a melt comprising calcium chloride and operating at high temperatures of the order of 900 degrees C. or above by virtue, inter alia, of its good electrical conductivity, physical and chemical resistance to attack in chloride melts at the high temperatures employed.

It has also been surprisingly found that calcium ruthenate, unlike the calcium compounds of other metal oxides that are electrical insulators, is a good electrical conductor and is therefore suitable to be used as an inert electrode material. Moreover, it is chemically much more stable than the constituent oxides, is resistant to attack by chlorine and oxygen and its electrical conductivity approaches or even exceeds that of metals.

As calcium ruthenate is an electrical conductor, it is generally not soluble in molten calcium chloride which is predominantly ionic in nature, and is therefore especially suitable for use as an anode in Cambridge FFC baths.

However, it has found to be expedient for a small amount of calcium oxide to be present in the calcium chloride melt; otherwise, the calcium chloride will tend to leach calcium oxide from the ruthenate. In this respect, thermodynamic calculations show that about 0.2 wt % calcium oxide in the calcium chloride is generally sufficient to prevent the leaching of calcium oxide from the ruthenate.

At the temperature of the FFC melt, of the order of 900 degrees C., calcium ruthenate is stable with respect to chlorine as the reaction:

$$CaRuO_3 + 3Cl_2 = RuCl_4 + CaCl_2 + 1.5O_2$$

and has a positive free energy of 88 kJ. The material is, therefore, stable with respect to the presence of chlorine gas which will always be present, mostly at a very low partial pressure.

Calcium ruthenate also has a very high electronic conductivity at room temperature which is relatively independent of temperature.

Anode materials of the invention may comprise calcium ruthenate per se. However, in view of their high cost, they may comprise a layer, very preferably a continuous layer, of calcium ruthenate on an electrically conducting substrate.

A suitable substrate may comprise one of steel, tungsten, copper or nickel.

A preferred substrate material would be tin oxide. This material is suitable in that ruthenium oxide and tin oxide are mutually soluble and the anode could be prepared by sintering a layer of ruthenium oxide on to a substrate, for example a rod, of tin oxide to form a gradation of pure ruthenium oxide on the exterior to pure tin oxide-based conductor at the centre of the substrate. This anode would then be exposed to a calcium chloride/calcium oxide mixture at, say, 900 degrees C. to form a layer of calcium ruthenate on the anode surface.

The tin oxide substrate material is preferably doped in order to optimise its electrical conductivity.

Alternative substrates could be employed for the calcium ruthenate anode material. It is, however, important in most instances that the outer coating of calcium ruthenate is a continuous one, ie at least across the whole of the surface to be immersed in the electrolyte, to ensure optimum anode performance characteristics. One exception to the outer coating of calcium ruthenate being continuous, as disclosed below, is when it is mixed with calcium titanate.

As an alternative way of keeping the anode cost to a minimum, the anodes may comprise a mixture of calcium ruthenate with one or more other substances not substantially affecting the required anodic properties of the calcium ruthenate.

One such other substance is calcium titanate [nominal formula $CaTiO_3$ although different stoichiometries may apply in practice].

In the case of calcium titanate as the other substance, the anode material may comprise from 5 to 95% of calcium ruthenate and 5 to 95% of calcium titanate, preferably from 5 to 25% of calcium ruthenate and balance calcium titanate. Specific examples nominally contain 5%, 10%, 15% 10 and 20% calcium ruthenate with the balance being calcium titanate.

All percentage amounts referred to herein are by weight. The anode may additionally contain other ingredients not substantially affecting the properties of the anodes of the invention.

It has also been surprisingly found that calcium titanate is a particularly suitable diluent material in anodes of the invention by virtue of its exhibiting a general compatibility with calcium ruthenate in terms including their similar coefficients of expansion and, in combination with calcium ruthenate, a surprisingly good overall electrical conductivity despite, as noted above, calcium titanate itself not being a good electrical conductor.

This compatibility between calcium ruthenate and calcium titanate is thought to be due, at least in part, to their co-dissolution in each other at the usual anode production temperatures which are generally in excess of 1100 degrees C., for example 1200 degrees C.

The resistivity of pure calcium ruthenate is $3.16 \times 10^{-3}$ ohm cm at room temperature. Calcium ruthenate forms a complete series of solid solutions with calcium titanate $CaTi_xRu_xRu_{1-x}O_3$. The addition of $CaTiO_3$ increases the resistivity to about $1 \times 10^{-1}$ ohm cm at $x=0.3$. The temperature dependence of the conductivity is low. Up to about $x=0.3$, the solid solution is a metallic conductor but at values of x greater than $x=0.3$, the solid solution becomes a semi-conductor and the resistivity increases considerably to about 10 ohm cm at $x=0.7$. However, one of the properties of a semi-conductor is that the resistivity decreases with temperature so that although the resistivity can be high at room temperature, it can be reduced to about $10^{-2}$ ohm cm at 900 C for $x=0.3$. It is interesting to note that the temperature dependence of the resistivity increases as x falls. This means that quite dilute solutions of $CaRuO_3$ can be used and still have low resistivities at about 900 degrees C., the temperature of operation of FFC baths.

In preferred embodiments of the invention (and to which general reference is made above), the anode materials comprise calcium ruthenate as an external coating on a calcium titanate inner substrate.

In further embodiments, the anode materials may comprise a calcium ruthenate/calcium titanate mixture as a composite coating on a calcium titanate substrate.

In yet further embodiments of the invention, anodes are provided in which calcium ruthenate or a calcium ruthenate/calcium titanate mixture is applied as a coating on a electrically conducting substrate; such a substrate will generally require to exhibit good thermal conductivity, compatible thermal expansion coefficients with the coating and an ability to have the coating affixed thereto initially and subsequently during use thereof.

Examples of suitable substrates are tin oxide or a metal with a similar melting point and coefficient of expansion as the ruthenate-titanate solid solution.

The coating thicknesses are important as they must be sufficient to ensure that the coating is impermeable to the molten salt of the melt.

Further potential substrates include metallic lead or tin or metal alloys that are molten at the bath operating temperatures. In order to distribute the current to the anode, this could be effected, for example, by providing a hollow, closed end tube of the ruthenate filled with the tin, lead or alloy which would be molten at the bath operating temperatures, for example in the case of the FFC process in excess of 900 degrees C. As such, the liquid metals would form an internal conducting phase to ensure that an even current density is present through the inert anode material.

Various methods may be employed to produce anodes of the invention with calcium ruthenate as the active anode material, especially in terms of it providing acceptable anode properties including chemical and physical stability in baths including those with chloride melts and high electrical conductivity.

In particular, a layer of calcium ruthenate could simply be formed on a metallic substrate, for example on a rod substrate made of steel, tungsten, copper or nickel, by a coating process comprising, for example, sputtering or vapour deposition. As with other anodes of the invention, there is a need to avoid the presence of any discontinuities or 'pin holes' in the layer which might be caused by different coefficients of expansion between the ruthenate and the substrate to avoid the possibility of corrosion of the substrate and loss of physical stability of the anode as a whole.

The anode production could be effected by starting with ruthenium metal in either soli form or plated on to a substrate which is then oxidised in situ to form ruthenium oxide and subsequently reacted to form calcium ruthenate.

Additionally, the calcium ruthenate can be made by mixing calcium oxide and ruthenium oxide together and firing at a temperature of about 1300 degrees C. for several days.

Alternatively, a ruthenium oxide rod, plate or other preform could be sintered at a temperature of about 1200 degrees C. and then placed in an electrolyte comprising calcium chloride containing a small amount of calcium oxide at about 900 degrees C.

As stated above, the cost of providing calcium ruthenate anodes of the invention may be minimised by making the calcium ruthenate as a continuous layer on an electrically conducting substrate. For example, ruthenium oxide may be sintered on to a substrate, for example a rod, of electrically conductive tin oxide to form a substantially uniform gradation of pure and continuous ruthenium oxide on the exterior and pure tin oxide at the centre of the resulting anode. The external layer is then exposed to a calcium chloride/calcium oxide mixture to form a layer of continuous calcium ruthenate on the surface. It should be noted in respect of this method of making the anodes that, thermodynamically, calcium ruthenate is more stable than calcium stannate.

Anode materials produced by use of any of the disclosed methods of production are included in the scope of this invention.

In relation to calcium chloride electro-chemical melt processes in particular, for example the Cambridge FFC process, it is thought from the general thermodynamics of various metal oxides that under the usual conditions encountered in the melt calcium compounds are likely to be formed. This would afford the possibility that at least some of the calcium ruthenate could be formed in situ in the melt.

This in situ formation of calcium ruthenate is particularly applicable to anodes comprising or at least having an outer coating containing ruthenium oxide. Anodes materials so formed form part of the inventive concepts disclosed herein.

Other ruthenates, such strontium ruthenate, exist and possess similar electrical properties to calcium ruthenate; however, in the presence of calcium chloride, they would revert to calcium ruthenate with the strontium chloride dissolving in the calcium chloride:

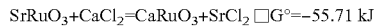

$$SrRuO_3 + CaCl_2 = CaRuO_3 + SrCl_2 \quad \Box G° = -55.71 \text{ kJ}$$

This further type of in situ formation of calcium ruthenate to form anodes of the invention is also included in the scope of this invention.

For a better understanding of the invention, reference will now be made to different examples of how the invention may be put in to effect.

With regard to the production of anodes of the invention:
(1) an anode material comprising calcium ruthenate on a substrate of calcium titanate was prepared by sintering calcium ruthenate and calcium titanate at 1200 degrees C. for several days.
(2) a separate anode material was prepared by sintering an outer layer of calcium ruthenate, having a thickness of about 1 mm, on to a tin oxide rod substrate at about 1200 degrees C.
(3) a further anode material was prepared by sintering a layer of ruthenium oxide on to a rod of tin oxide at a temperature of about 1000 degrees C. The anode was then exposed to a calcium chloride melt containing about 0.2% by weight of calcium oxide at about 900 degrees C. to form a continuous layer of calcium ruthenate on the anode surface.

With regard to the use of anode materials of the invention as anodes in an electrolytic process:

An electro-winning bath for the extraction of titanium from a titanium oxide start material utilising an FFC type of bath was prepared comprising a calcium chloride melt with the addition of about 1 to 2% of calcium oxide. An anode of the invention, with particular reference to the examples above, was inserted in to the melt with the cathode comprising the titanium start material and the melt containing 0.2% by weight of calcium oxide in order to prevent leaching of calcium oxide from the calcium ruthenate.

The invention claimed is:

1. An anode material for use in electrolytic processes comprising a mixture of calcium ruthenate and calcium titanate.

2. An anode material according to claim 1 comprising a layer of the mixture on an electrically conducting substrate.

3. An anode material according to claim 2 in which the electrically conducting substrate is selected from the group consisting of steel, tungsten, copper and nickel.

4. An anode material according to claim 2 in which the electrically conducting substrate is tin oxide.

5. An anode material according to claim 2 in which the electrically conducting substrate includes metallic lead or tin or metal alloys that are configured to be molten in use, with liquid metal forming an internal conducting phase to ensure that an even current density is present through the anode material.

6. An anode material according to claim 1 comprising from 5 to 95% calcium ruthenate and a balance of calcium titrate.

7. An anode material according to claim 1 containing from 5 to 25% calcium ruthenate.

8. An anode material according to claim 1 in which the mixture is a calcium ruthenate—calcium titanate solid solution.

9. An anode material according to claim 1 in which the mixture is a composite coating on a calcium titanate substrate.

10. An anode material for use in electrolytic processes comprising a layer of calcium ruthenate on an electrically conducting substrate of tin oxide.

11. An electrolytic process for recovery of a metal from an oxidic start material incorporating the metal comprising: providing a melt comprising calcium chloride at an operating temperature of the order of 900° C. or above; immersing an anode and a cathode in the melt, the cathode being formed from the oxidic start material; and applying a potential to the cathode such that oxygen in the oxidic start material ionises and dissolves in the melt; wherein the anode comprises calcium ruthenate.

12. An electrolytic process according to claim 11, in which the melt further comprises calcium oxide.

13. An electrolytic process according to claim 11, in which the anode comprises an anode material comprising a mixture of calcium ruthenate and calcium titanate.

* * * * *